E. L. FOREMAN.
Gangways for Transferring Cattle.
No. 150,014. Patented April 21, 1874.
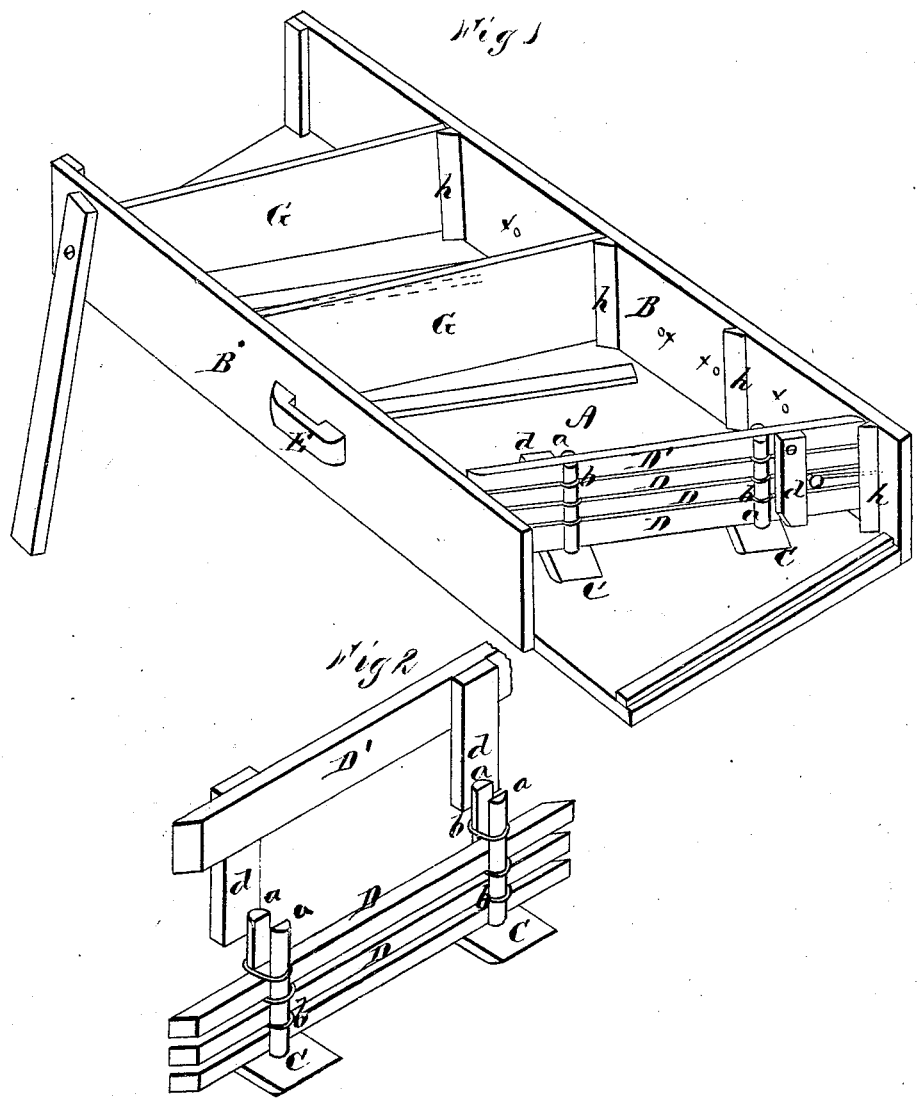

UNITED STATES PATENT OFFICE.

EDWIN L. FOREMAN, OF RANTOUL, ILLINOIS.

IMPROVEMENT IN GANGWAYS FOR TRANSFERRING CATTLE.

Specification forming part of Letters Patent No. 150,014, dated April 21, 1874; application filed February 4, 1874.

*To all whom it may concern:*

Be it known that I, E. L. FOREMAN, of Rantoul, in the county of Champaign and in the State of Illinois, have invented certain new and useful Improvements in Railroad and Slaughter-House Chute; and do hereby declare that the following is a full, clear, and exact description thereof, reference being had to the accompanying drawings and to the letters of reference marked thereon, making a part of this specification.

The nature of my invention consists in the construction and arrangement of a chute and movable gate for conducting cattle into railroad-cars or slaughter-houses, as will be hereinafter more fully set forth.

In order to enable others skilled in the art to which my invention appertains to make and use the same, I will now proceed to describe its construction and operation, referring to the annexed drawing, in which—

Figure 1 is a perspective view of the chute and gate, and Fig. 2 is a detached view of the gate.

A represents the bottom, and B B the sides of an ordinary chute, such as are used for conducting cattle or other animals into railroad-cars or slaughter-houses.

My movable gate is constructed in the following manner: $c$ $c$ are two elongated feet or shoes, upon each of which are two standards or posts, $a$ $a$, placed a sufficient distance apart to admit horizontal boards, planks, or scantlings D D between them, links or wires $b$ $b$ being passed around the posts $a$ $a$ between the boards D D. A wide board, D', is placed between the upper ends of the posts $a$ $a$, said board having at each end a vertical board or guide, $d$, extending downward to the bottom of the gate, said guides being located one on each side of the gate, so that the board D' will be held firmly in position, and yet be easily detachable from the bottom part of the gate. The gate being provided with feet or shoes $c$ $c$ it will not fall over, and being double it can be separated if too heavy, the lower part being used for sheep and hogs, and the top part for cattle or horses. When the top part of the gate is not in use it may be held in a loop, E, on the side of the chute A B. In moving the gate behind a few sheep or hogs up the chute, they can be crowded easily up to the top of the chute, and the balance of the stock will follow rapidly. By placing a similar gate or a solid gate, G, behind the whole drove, the stock will be kept moving into the car or slaughter-house rapidly, and with but little trouble to the drover. The top part D' $d$ of the gate can be moved after cattle in the same way as the lower part after sheep and hogs, with the same success. On the sides of the chute are vertical cleats $h$ $h$ to prevent the gates from sliding back, and the sides are also provided with holes $x$, for the insertion of pins, to assist in keeping the gate from sliding back.

Having thus fully described my invention, what I claim as new, and desire to secure by Letters Patent, is—

The within-described device for conducting cattle, consisting of the chute A B, with holes $x$, cleats $h$, and the movable double gate, composed of the posts $a$ $a$, shoes $c$ $c$, boards D, wires $b$, board D', and guides $d$ $d$, all constructed and used substantially as and for the purposes set forth.

In testimony that I claim the foregoing I have hereunto set my hand this 30th day of December, 1873.

EDWIN L. FOREMAN.

Witnesses:
ABRAHAM CROSS,
C. L. EVERT.